March 1, 1966

C. M. PERKINS ET AL 3,237,472

AUTOMOTIVE DEVICE

Filed Dec. 29, 1964

INVENTORS
CHARLES M. PERKINS
ELMER A. RICHARDS
BY
Woodhams, Blanchard & Flynn
ATTORNEYS March 1, 1966  C. M. PERKINS ET AL  3,237,472
AUTOMOTIVE DEVICE Filed Dec. 29, 1964  3 Sheets-Sheet 2

INVENTOR.
CHARLES M. PERKINS
ELMER A. RICHARDS
BY
Woodhams, Blanchard & Flynn
ATTORNEYS

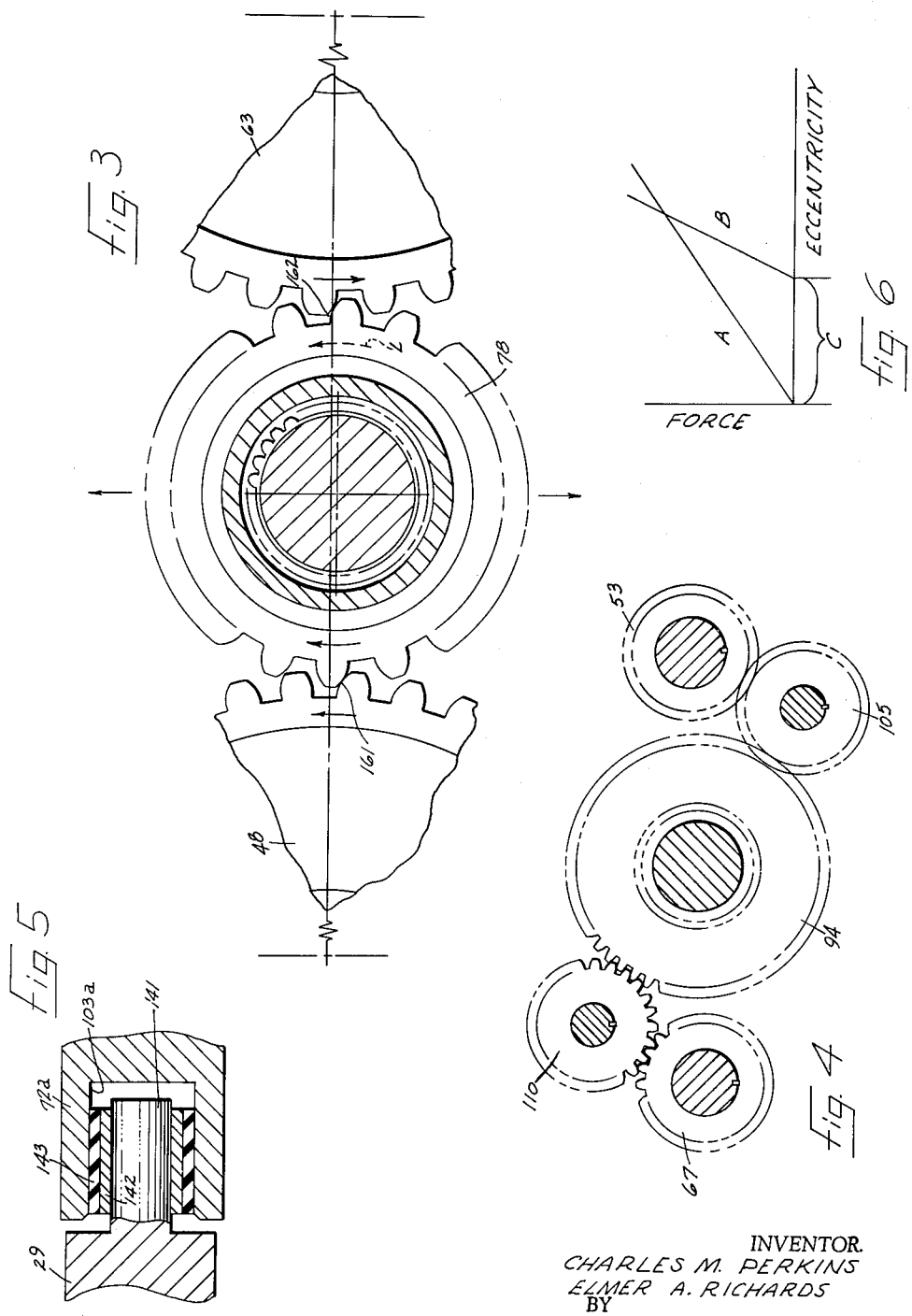

United States Patent Office 3,237,472
Patented Mar. 1, 1966

3,237,472
AUTOMOTIVE DEVICE
Charles M. Perkins, Kalamazoo County, Mich., and Elmer A. Richards, Peoria County, Ill., assignors to Eaton Manufacturing Company, Cleveland, Ohio, a corporation of Ohio
Filed Dec. 29, 1964, Ser. No. 425,665
29 Claims. (Cl. 74—331)

This application is a continuation-in-part of application Serial No. 296,956 filed by the same inventors on July 23, 1963, and assigned to the same assignee as the present application.

This invention relates to a transmission and relates particularly to the mounting of the intermediate of floating shaft in a multicountershaft transmission of the type shown in the application of Charles M. Perkins, Serial No. 247,797, filed December 26, 1962, now Patent No. 3,105,395, dated October 1, 1963, assigned to the same assignee as the present application and relating also to the connection in driving-driven relationship of a shaft with a substantially coaxial power transmitting device wherein said shaft and said power transmitting device are relatively radially movable.

In said application there is disclosed and claimed a transmission wherein two or more countershafts are utilized and radially aligned gears on each of said countershaft simultaneously engage and support a gear encircling an intermediate floating shaft which shaft in said application is sometimes referred to for descriptive convenience as the main shaft of the transmission. In said application, means are disclosed by which said intermediate shaft is permitted to move transversely with respect to a plane including the axes of two countershafts positioned substantially on opposite sides of said main shaft but the specific means therein shown for supporting said intermediate shaft and/or connecting same to power transmitting means are relatively expensive to manufacture, somewhat awkward in assembly and utilize an appreciable amount of longitudinal space.

In an effort to effect further improvements in a transmission of this general type, efforts have been made to provide means diminishing each of the foregoing-named disadvantages and the following-described invention is the result.

Accordingly, the objects of the invention include:

(1) To provide mounting means for a rotatable shaft to permit same to move in any radial direction while rotating but at all times tending to return said shaft to an original or normal position.

(2) To provide shaft mounting means, as aforesaid, which will be less expensive to manufacture and assemble and which will require less longitudinal room for installation than the mounting means for the main shaft shown in Patent No. 3,105,395 above-mentioned.

(3) To provide shaft mounting means, as aforesaid, wherein the restoring force tending to return said main shaft to its normal position increases progressively with the amount of displacement from said position.

(4) To provide shaft mounting means, as aforesaid, which will be capable of rapid and inexpensive assembly and will require a minimum of parts for providing an effective and trouble-free unit.

(5) To provide means for effecting the connection in driving-driven relationship of a shaft with a substantially coaxial power transmitting device wherein said shaft and said power transmitting device are relatively radially movable.

Other objects and purposes of the invention will be apparent to persons acquainted with apparatus of this general type upon reading the following disclosure and upon inspection of the accompanying drawings.

FIGURE 3 is a fragmentary section taken on the line III—III of FIGURE 1.

FIGURE 4 is a fragmentary section taken on the line IV—IV of FIGURE 1.

FIGURE 5 is a fragmentary view showing of an alternate mounting means for said main shaft embodying the broader principles of the invention.

FIGURE 6 is a graphical representation of forces applied versus the lateral displacement of the main shaft of a transmission embodying the invention.

*General description*

Figure 1:
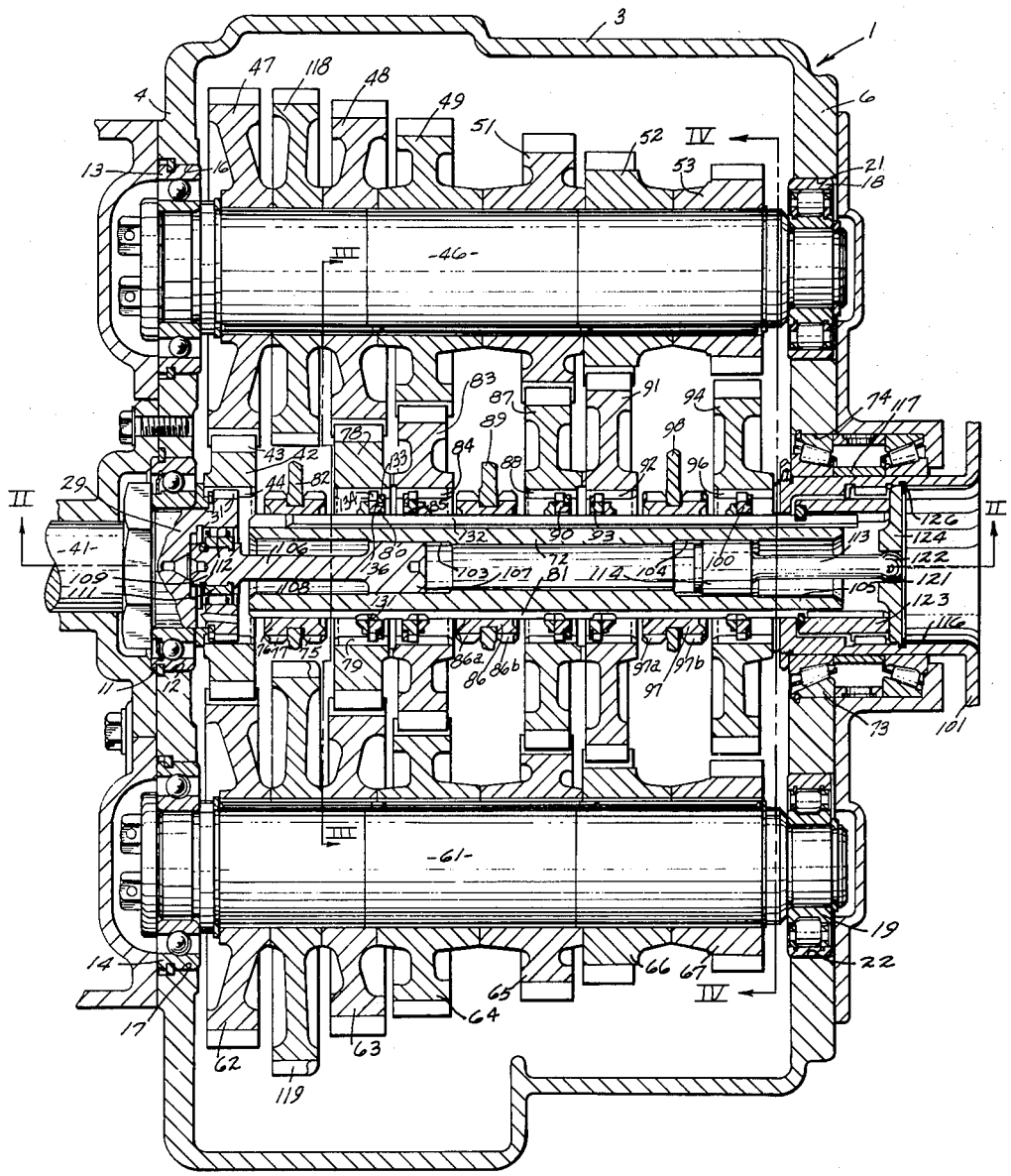
FIGURE 1 is a fragmentary central section through both countershafts and the main shaft of a two-countershaft system and indicated by the line I—I of FIGURE 2.

In general, the shaft mounting aspect of the invention includes mounting the floating or intermediate shaft on means located at each axial end of the shaft with, in a slightly narrower sense, said means being located at least partially within said shaft as distinguished from the external mounting of said intermediate shaft in the structure shown in Patent No. 3,105,395. One preferred embodiment of such internal mounting is shown in the drawings and comprises a relatively narrow elongated member mounted within the shaft extending axially outwardly from each end thereof in somewhat of a cantilever fashion. The respectively free ends of said last-named members are supported for rotative movement but held against radial movement by suitable adjacent supporting means.

The shaft connecting aspect of the invention comprises introducing a sleeve coaxially with and between said shaft and the power transmitting device to be drivingly connected at its one end to the shaft and at its other end to the power transmitting device and said sleeve being at both its ends axially rockable with respect to the axes of both of said shaft and said power transmitting device.

*Detailed description*

In general, the embodiment shown in the drawings and selected to illustrate the invention is described in sufficient detail in said application Patent No. 3,105,395 that detailed description therein is unnecessary. However, for purposes of convenient reference, the following description of the transmission comprising the environment of the present invention is presented.

Figure 2:
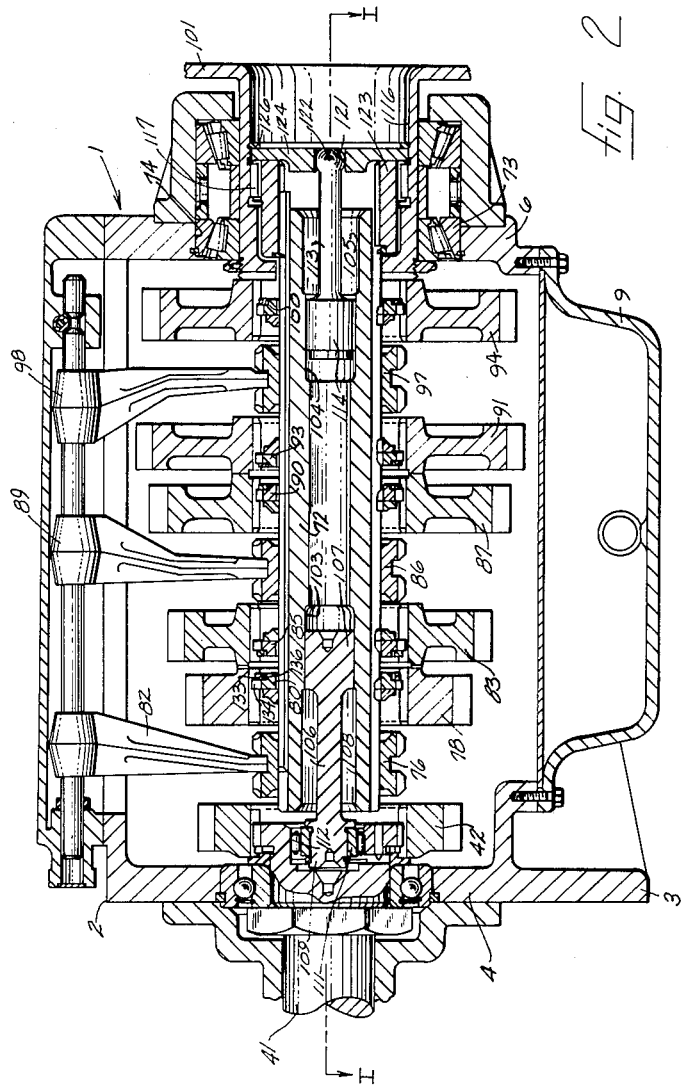
FIGURE 2 is a fragmentary central section yielded by a cutting plane perpendicular to the plane of the countershafts and indicated by the line II—II of FIGURE 1.

In the following description certain terminology will be used for convenience of reference but it will be understood that such terminology will be for convenience only and will have no limiting significance. For example, the terms "forward" and "rearward" will refer to directions forward and rearward of the vehicle in which the transmission is installed. Thus, the leftward portion as appearing in FIGURES 2 and 3 is forward and the rightward portion of the transmission as appearing in said figures is rearward. The terms "rightward" and "leftward" will refer to dirsetions as taken in the drawings in connection with which said terminology is used. The terms "inward" and "outward" will refer to directions toward and away from the geometric center of the apparatus. All terms mentioned foregoing include all normal derivatives and equivalents of each thereof.

For convenience of identification, the shaft 41 has throughout been called the input shaft, and the shaft 72 has been called the main shaft and the shaft 101 has been called the output unit. This terminology has, however, only been used for convenience in reference and it is to be given no limiting significance, inasmuch as the apparatus will operate equally well with the direction of power flow reversed.

Referring now to the drawings, there is provided a casing 1 which is horizontally split into upper and lower portions 2 and 3, respectively. Said lower portion 3 has a forward end wall 4 and a rearward end wall 6. A suitable, depending, oil pump 9 may be provided if desired.

Each of said walls is provided with openings for the reception of the various shaft bearings. The input shaft bearing 11 is supported in a suitable opening 12 (FIGURE 1) in the wall 4. The countershaft bearings 13 and 14 are supported in suitable openings 16 and 17, respectively, in said forward end wall 4. Countershaft bearings 18 and 19 are supported in openings 21 and 22, respectively in the rearward wall 6.

An input shaft 41 is supported in the bearing 11 and has an enlarged head 29 formed on the rearward end thereof. Said head 29 carries splines 31 and carries thereon the annular drive gear 42. Said drive gear has external teeth 43 and internal clutch teeth 44. A first countershaft 46 is supported by the bearings 13 and 18 and carries thereon and fixed for rotation therewith the counter shaft ratio gears 47, 48, 49, 51, 52 and 53.

A second countershaft 61 is supported within the bearings 14 and 19 and is in all respects preferably identical with the first countershaft 46. Second countershaft ratio gears 62–67 are mounted on and for rotation with the second countershaft 61 and are preferably respectively identical with the ratio gears 47, 48, 49, 51, 52 and 53. The countershaft gears 47 and 62 are in constant mesh with the input gear 42.

The main shaft 72 is arranged substantially coaxial with the input shaft 41 and is resilinetly supported as hereinafter described in further detail. Gears are provided encircling the main shaft for constant engagement with and support by the countershaft gears and said countershaft gears and/or said main shaft gears are appropriately clutched, to each other or to their respective shafts, in any convenient manner to provide driving connections from the two countershafts through a selected pair of countershaft gears to and through the main shaft gear associated therewith to the main shaft. The particular method of clutching hereinafter described will thus be recognized as illustrative only and not limiting.

In this particular embodiment, the main shaft clutch unit 76 is slidingly mounted on the forward end of said main shaft 72 on splines 81 and carries clutch teeth 77 which are engageable with the clutch teeth 44 upon leftward movement of said clutch unit 76. Clutch unit 76 also carries clutch teeth 75 which engage suitable internal clutch teeth 79 in a gear 78 upon rightward movement of the clutch unit 76. The gear 78 is meshed with and carried by the countershaft gears 48 and 63. Said clutch unit 76 is provided with any suitable means for effecting axial movement thereof, such as by the usual grooves and a shift fork 82 (FIGURE 2).

The main shaft gear 83 is supported between and by the countershaft gears 49 and 64 and has a set of internal clutch teeth 84. Clutch unit 86 is slidingly mounted on the splines 81 of the main shaft and is externally toothed at 86a to engage the teeth 84 upon leftward movement of said clutch unit 86 for clutching said gear 83 to the shaft 72. The gear 87 is supported between and by the countershaft gears 51 and 65 and is provided with internal clutch teeth 88 for engagement with the teeth 86b of the clutch unit 86. Said clutch unit 86 is axially slideable for alternate but only alternate engagement of said gears 83 and 87 and such axial movement is effected in any convenient manner, such as by a conventional shift fork 89. The main shaft gear 91 is supported between and by the countershaft gears 52 and 66 and is provided with internal clutch teeth 92 for engagement with the teeth 97a of a clutch unit 97. The main shaft gear 94 is supported on and between the usual reverse idler gears 115 and 110 (FIGURE 4) which are in turn engaged with the gears 53 and 67, respectively. The gear 94 has internal clutch teeth 96 for engagement with the teeth 97b of the clutch unit 97. The clutch unit 97, like the clutch units 76 and 86, is slidingly mounted on the splines 81 of the main shaft and is actuated by any conventional means, such as a shift fork 98 to alternately connect the gears 91 and 94 to the main shaft 72. The gears 118 and 119 in this embodiment are power take-off gears and although they are driven with the respective countershafts 46 and 61 they are not involved in the present invention excepting as part of the entire apparatus.

Axial movement of the several main shaft gears may be prevented by an convenient and conventional device such as the devices 80, 85, 90, 93 and 100 shown in FIGURES 1 and 2. Referring to the device 80, the same is provided with internal splines interengaging with the external splines 81 of the shaft 72. A groove 131 is cut circumferentially through the splines 81 whereby the device 80 may be rotated a distance equal to the width of one spline tooth whereby it is held firmly against axial movement. All of the remaining devices 85, 90, 93 and 100 are similarly related to the shaft 72 and all thereof are in this embodiment locked into position by a single long key 132 extending substantially the full length of said shaft 72. A snap ring 133 is received into a circumferential groove 134 in the gear 78 and acts against the rightward facing surface of an external shoulder 136 on the device 80 to prevent leftward axial movement of the gear 78 with respect to the shaft 72. It will be noted, however, that the internal diameter of the snap ring 133 is sufficiently greater than the external diameter of that portion of the device 80 directly, radially, inwardly thereof that a substantial clearance is provided therebetween in order that the presence of the device 80 will not in any way interfere with movement of the gear 78 in any radial direction with respect to the shaft 72. Thus, it should again be emphasized that the gear 78 is in no degree or sense supported on or by the shaft 72 and the device 80 functions only to prevent axial motion of said device or said gear 78 leftwardly as appearing in FIGURE 2 with respect to said shaft 72.

The device 85 is an axially inverted mirror image of the device 80 and functions with respect to the gear 83 to prevent axial motion of said gear 83 rightwardly with respect to the shaft 72. Rightward motion of the gear 78 is prevented by the presence of the gear 83 and leftward motion of the gear 83 is prevented by the pressure of the gear 78.

The devices 90 and 93 are similar to the devices 80 and 85, respectively, and function similarly with respect to the gears 87 and 91, respectively. The device 100 is similar to the device 80 and functions similarly therewith with respect to the gear 94. Rightward motion of the gear 94 is prevented by the leftward extremity of the output member 101.

Each of said gears 78, 83, 87, 91 and 94 may be collectively termed "main shaft gears," since they are all capable of drivingly engaging the main shaft. However, it is emphasized that they are all supported on and by the countershaft gears and they merely surround and at times engage the main shaft but are not supported on or by the main shaft. Rather, as will be further developed later, the main shaft will move both rotatively and radially with respect to those of the main shaft gears with which it is not clutched at a particular moment.

Since each of the main shaft gears is constantly engaged with the countershaft gears upon which it is supported, engagement or disengagement of a given main shaft gear with the main shaft will not affect its relationship with the countershaft gears upon and by which it is supported.

An output unit 101 is rotatably mounted in a bearing 73 which is in turn fixed in an opening 74 in the rear wall 6 of the transmission casing. As here shown, said output unit 101 is a hollow shaft provided with a flange for affixing thereto any suitable driven means, such as universal joint means, but it will be recognized that it may also be the input gear of an auxiliary transmission arranged serially with respect to the transmission unit herein illustrated and described. Said output unit 101 is driven by the main shaft 72 in any convenient manner, such as by the means further hereinafter described.

Now turning in more detail to the constructional mounting of the main shaft 72, said main shaft as herein illustrated has centrally positioned end recesses 103 and 104 located at each end thereof. A generally elongated rod-shaped hanger 106 is positioned at the forward (leftward as appearing in FIGURE 1) end of said main shaft with its rightward, or inner, end 107 suitably enlarged to fit tightly, as by a press fit, within said opening 103. Preferably for assembly purposes, said opening will have a slightly larger diameter 108 at the leftward or outer portion thereof to facilitate the entry of said enlarged end 107 thereinto. The outer (leftward as appearing in FIGURE 1) portion of said hanger 106 has an enlarged end 109 which is received within the bearing structure 111 which is in turn mounted within an internal opening 112 in the inner end of the input shaft 41. Said bearing 111 preferably has only a single set of rollers which rollers are of relatively short axial extent so that the normal clearances within said bearing will permit a slight angular movement of the elongated hanger 106 with respect to the axis of the input shaft 41 which is required by the normal operation of the apparatus.

A generally similar mounting is provided at the rightward end of the main shaft 72. Here an elongated rod-like hanger 113 extends into the opening 104 and has an enlarged inner end 114 which snugly engages the walls of said opening 104, such as by a press-fit. If desired, the outer zone 105 of said opening 104 may be of slightly enlarged diameter to facilitate the entry of said enlarged portion 114 thereinto. The outer or rightward end of the hanger 113 is mounted in any convenient manner for radial rigidity but preferably slight angular movement on and with respect to the output unit 101. In this embodiment, said output unit is provided with an internal opening 116 having internal teeth 117. A plate 124 is received within said internal opening and held in place by any suitable means such as a snap ring 126. Said plate 124 has a cylindrical opening 121 centrally therethrough and said opening receives the rightward end of the hanger 113. Preferably and as shown in this embodiment, the rightward end of said hanger 113 is provided with a slightly enlarged rounded end 122 to facilitate its angular movement with respect to the axis of the output unit 101. A connecting sleeve 123 is internally splined and received within the splines 81 of the main shaft 72 and is externally toothed to drivingly engage the internal teeth 117 of the output unit 101.

Thus, the output unit 101 will necessarily rotate with said main shaft 72, will have a substantial amount of freedom of radial movement in any direction with respect to the axis of the output unit 101 and with respect to the input shaft 41.

Synchronizers or blocking rings can, if desired, be provided between the interengageable teeth associated with the main shaft 72. However, in the particular embodiment here illustrated, the ratios are as set forth for the main transmission in the patent to Ludvigsen and Backus, No. 2,637,221 and the use of synchronizers in the main gear set is accordingly unnecessary.

*Operation*

The operation of the apparatus has been somewhat indicated previously but will be reviewed fully to insure a clear understanding of the invention.

Input power from the shaft 41 is supplied to the input gear 42 and is thence delivered to the countershafts 46 and 61. By suitable manipulation of one of the shift forks 82, 89 and 98, one of the main shaft gears, such as the gear 78, is engaged with the main shaft, and the power is then conducted from the two countershafts through such gear to the main shaft 72. The power then travels through the main shaft 72 to and through the driving sleeve 123 and thence to the output unit 101.

Turning now to the relationship between the floating main shaft of the transmission and the countershafts, it may be stated again that the transmission here shown follows the same general principles as set forth in application Patent No. 3,105,395 and that the improvement here in question deals with only the mounting of the main shaft. However, for convenience in reference and to insure a complete understanding of the present invention, the operation of the entire unit will be briefly reviewed.

In this connection it will be emphasized first that the main shaft has no bearing relationship with the several main shaft gears but is only clutched to such thereof as is desired to be brought into the power train. However, the main shaft gear which in any given instance is clutched with the main shaft will engage same uniformly around the entire circumference of said main shaft and thereby hold it centered in and with respect to said gear. Therefore, since the resilient end hangers 106 and 113 permit radial movement of the main shaft, any main shaft gear which is clutched to the main shaft will carry the main shaft with it if and as it moves upwardly or downwardly between the auxiliary countershaft gears with which said clutched main shaft gear is engaged.

The main shaft gears themselves will in their initial assembly be positioned between the countershaft gears associated therewith in such position that their axes are at least approximately in the common plane joining the axes of the countershaft gears. Then, as the given pair of countershaft gears rotate, the main shaft gear associated therewith will normally remain centered inasmuch as its tendency to move off said center in one direction in response to one countershaft gear is counterbalanced by an equal tendency to move in the opposite direction in response to the opposite countershaft gear. In effect, as set forth in more detail in application Patent No. 3,105,395, a balanced couple is created by the equal and oppositely directed forces applied to the opposite sides of the main shaft gear. This will be effective inasmuch as both of said countershafts are rigidly locked to a single input shaft and said countershafts are, through said clutched main shaft gear, also rigidly locked to a single output shaft.

However, if one countershaft gear, which for example may be taken as the countershaft gear 48, is irregular in shape, either within itself or as compared to the opposite countershaft gear, it may, if no compensating adjustment is made, tend to develop more pressure due to such irregularity on the associated main shaft gear 78 in an upward direction than is counterbalanced by the downwardly acting pressure from gear 63. In such case, the load torque on the main shaft gear 78 will move said main shaft gear 78 in a direction opposite to the direction in which it is being driven and thereby restore the balance between the said main shaft gear and the countershaft gears connected thereto. This may be best illustrated by reference to FIGURE 3 wherein there appears a fragment of gear 48, a schematic indication of gear 78, and a fragment of gear 63. The solid line arrows indicate the direction of rotation of each of said gears. The tendency for an increasing pressure between gear 48 and the main shaft gear 78 is indicated by the solid contact between the respectively engaged gear teeth at 161 and the tendency for a lessening pressure between interengaged teeth of gear 78 and auxiliary shaft gear 63 is indicated by the space 162 between adjacent teeth of said last-named gears. The broken line L indicates the load torque which is applied to the main shaft gear 78 by the load which said gear is driving.

It will be apparent from inspection of said FIGURE 3, and bearing in mind that gear 78 is permitted to move freely in a vertical direction, that regardless of the pressure exerted on the gear 78 at the point 161, said load torque will effect a counterclockwise rotation of said gear 78 and thereby move the rightward side of said gear upwardly until the pressure at 162 equals the pressure at 161.

If the tendency toward an unbalance occurs in the opposite direction, then the load torque will move the gear 78 downwardly to bring it again into balance with the adjacent gears 48 and 63.

This movement, and the resulting balancing of forces applied at points 161 and 162 obtained thereby, will occur very rapidly, virtually instantaneously, so that there is no likelihood of any appreciable unbalance occurring between the forces at the opposite contact points 161 and 162. As long as said forces remain equal, and bearing in mind that the gears 48 and 63 are of the same diameter and rotating at the same speeds, both the torque and the horsepower transmitted through each of the countershaft gears 48 and 63 will at all times remain equal.

In the example above given, attention was directed toward the countershaft gears 48 and 63 and the main shaft gear 78 associated therewith. It will be apparent that the same effects will be obtained regardless of which of the gear sets is clutched.

It will be recognized that the foregoing-described operation may, and often will, effect a slight angular movement of the axis of the main shaft 72 with respect to either or both the axis of the input shaft 41 or the axis of the output unit 101. These angular movements are permitted in the manner above set forth together with the clearance between the respectively interengaging splining at both the inner and outer portions of the driving sleeve 123.

In the foregoing discussion with respect to the operation of the embodiment chosen to illustrate the invention, reference has been made solely to the perpendicular movement of the countershaft gears with respect to a plane through the axes of the countershafts, and this is the movement which is effective in bringing about the proper division of power between the countershafts as above set forth. In actual practice, however, as is pointed out in said Patent No. 3,105,395, there is in any case some limited side movement of the engaged one of said main shaft gears with respect to the axes of the countershaft gears and in the present embodiment of the invention such movement, insofar as the main shaft mounting is concerned to the extent thus far discussed, may become substantial. Attention will now be directed toward the aspects of said invention by which this tendency for sideward movement is controlled.

It should first be noted that the forces urging such sideward movement are of small magnitude compared to the forces urging perpendicular movement (movement perpendicular to the plane extending through the axes of the countershafts) so that a relatively modest opposing force will prevent excessive sideward movement and still be insufficient to interfere with the above-described perpendicular movement.

Again referring to the drawings, and especially FIGURE 1, attention is directed to the fact that one end of each of the end hangers, the respective inner ends in the embodiment illustrated, is mounted rigidly onto said main shaft 72. Thus, movement of said main shaft in any radial direction will require some deflection of one or both of the hangers 106 and 113. By proper design of said hangers, the restoring force developed as same deflect can be made to rise rapidly and very quickly urge a return of said main shaft to the center position sufficient to overcome the forces urging a sideward deflection.

This is illustrated in FIGURE 6 wherein the line A represents an increase in force urging the gear sidewardly as same actually moves sidewardly whereas the line B illustrates the restoring force developed by the deflection of the hangers. The space C represents the clearance in the mechanism which must be taken up before a restoring force is developed.

On the other hand, although these same forces are developed by deflections of the hangers when the shaft moves in a perpendicular direction, the forces of the interengaged gear teeth in the direction parallel thereto is so much greater that the restoring force developed by said hangers is inconsequential.

While the embodiment here illustrated shows the hangers fixed rigidly into the main shaft 72 and mounted for slight angular movement with respect to the outer ends of said hangers, it will be obvious in the light of the foregoing that the rigid mounting may be at the outer ends of the respective hangers and the angularly movable mounting at the respective inner ends thereof. Both of these suggested modifications may be illustrated by FIGURE 5 wherein there appears a fragmentary central sectional view of the mounting at the forward (leftward end as appearing in FIGURE 1) end of the main shaft 72. Here the head 29a (corresponding to head 29 in FIGURE 1) has a rigidly mounted, here integral, and stiff projection 141 extending into the recess 103a of a main shaft 72a (corresponding to main shaft 72 in FIGURE 1). The inner end of said extension 141 is received into a bearing element 142, here shown as a bushing but could conceivably be any form of low friction bearing, which in turn is mounted on an annular resilient member 143, here a ring of rubber, said annular resilient member being then bonded firmly to the shaft 72a. The mounting 143 thus provides the possibility of radial movement of the shaft 72a in all directions with respect to the axis of the input shaft 41 and said resilient member 143 also provides for the angular movement of the forward end of said shaft 72a with respect to the axis of the input shaft 41.

It will also be recognized that a variety of other resilient constructions may be utilized for carrying out the principles of the present invention.

While the foregoing discussion has assumed for convenience of illustration that the power input is on the shaft 41 and the output is at the shaft 72, it will be understood that the system will operate effectively and within the scope of the invention regardless of the specific location of the input and output connections provided only that the power flow goes in one direction or the other through whichever of the floating gears is clutched to the shaft 72 at a given time. This follows from the floating character of said last-named shaft.

If the input is at the shaft 41 and the output load is on the shaft 72, a further load or loads, as one or more power take-off devices, may be applied to either or both of the countershafts, equally or unequally, and still without unbalancing the power applied to each side of the clutched main shaft gear. In such case, assuming the power take-off to be attached to only one countershaft, the power required for the shaft 72 will flow equally thereto through the countershafts while the power required for the power take-off will flow through the countershaft to which it is connected without disturbing the equality of power flow to the shaft 72.

Other permutations, arrangements and uses within the principles above described will be apparent in the light of the foregoing and will be recognized as within the scope of the invention.

For convenience throughout the foregoing discussion, it has been assumed that the torque loads in both countershafts are exactly equal. As a matter of accuracy, it should be noted that this would be strictly true only if the main shaft and the main shaft gears had no weight or if their weight were compensated by a suitable spring arrangement. However, the discrepancy is of insufficient magnitude to be significant and it can be ignored as compared with the total tooth loading.

The particular speed ratios and manner of shifting same herein represent any desired gearing and ratio arrangement and accordingly need no detailing.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a change gear system having a floating main shaft, a plurality of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent one end of said main shaft for rotatively supporting same and second means for rotatively supporting the other end of said shaft and simultaneously permitting radial movement of at least said other end of said main shaft in at least a direction transverse of a plane through the axes of two of said countershafts.

2. In a change gear system having a floating main shaft, a plurality of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent one end of said main shaft for rotatively supporting same while permitting simultaneous radial movement of said end of said main shaft and second means for rotatively supporting the other end of said shaft and simultaneously permitting radial movement of said other end of said main shaft in at least a direction transverse of a plane through the axes of two of said countershafts.

3. In a change gear system having a floating main shaft, a plurality of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent, and at least partially beyond, one end of said main shaft for rotatively supporting same and second means for rotatively supporting the other end of said main shaft, at least one of said means also permitting radial movement of said main shaft in at least a direction transverse of a plane through the axes of two of said countershafts.

4. In a change gear system having a floating main shaft, a plurality of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent, and at least partially within, one end of said main shaft for rotatively supporting same and second means for rotatively supporting the other end of said main shaft, at least one of said means also permitting radial movement of said main shaft in at least a direction transverse of a plane through the axes of two of said countershafts.

5. In a change gear system having a floating main shaft, a pair of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent, partially beyond and partically telescoping, one end of said main shaft for rotatively supporting same and second means for rotatively supporting the other end of said main shaft, both of said means also permitting radial movement of said main shaft in at least a direction transverse of a plane through the axes of said countershafts.

6. The device defined in claim 2 including also rotatably mounted means mounted for rotation about an axis which is fixed with respect to the axes of said countershafts and wherein said first means includes an elongated resilient rod fixed at one end with respect to said shaft and rotatably supported at its other end by said rotatably mounted means.

7. The device defined in claim 2 wherein said one end of said main shaft has a recess therein, an elongated support member having one of its ends within said recess and arranged for engaging supportingly said main shaft and its other end extending outwardly from said recess beyond the end of said main shaft, and rotatably mounted means rotatively supporting said other end of said support member, said rotatively mounted means arranged for rotation around an axis which is fixed with respect to the axes of said countershafts.

8. The device defined in claim 7 wherein the first end of said support member is fixed rigidly to said main shaft.

9. The device defined in claim 7 wherein said support member is of diameter less than that of said recess and said inner end of said support member is fixed rigidly to said main shaft at a point spaced inwardly from said one end of said main shaft, whereby at least a portion of the flexing of said support member as said main shaft moves radially with respect to the axis of said rotatively mounted means will occur within the portion thereof received within said recess.

10. The device defined in claim 7 wherein the resiliency characteristics of said support member are such that the force developed therein resisting deflection will rise at a rate faster than the forces developed on opposite sides of said main shaft gear when said gear shifts in a direction substantially parallel with said plane.

11. The device defined in claim 2 wherein said first means includes rotatively mounted means arranged for rotation around an axis which is fixed with respect to the axes of said countershafts and includes also an elongated support member extending coaxially between said main shaft and said rotatively mounted means, wherein said support member is mounted rigidly on and with respect to said rotatively mounted means, wherein said main shaft telescopes at least a portion of said support member and wherein said first means further includes bearing means having resilient means supporting said main shaft and said support member in rotative relationship with each other, said bearing means being received between the telescoped portions of said support member and said main shaft and being affixed rigidly to one of said support member and said main shaft and being affixed in rotative relationship with the other of said support member and said main shaft, said resilient means providing for radial movement of said main shaft with respect to said rotative member.

12. The device defined in claim 2 wherein said first means includes rotatively mounted means arranged for rotation around an axis which is fixed with respect to the axes of said countershafts and includes also an elongated support member extending coaxially between said main shaft and said rotatively mounted means, wherein a first portion of said support member is affixed rigidly onto said shaft and coaxial therewith and a second portion is resiliency flexible for radial flexing with respect to said first portion and extends beyond the end of said main shaft, said rotatively mounted means being affixed adjacent said end of said main shaft, and having its axis nonmovably related to the axes of said countershafts for rotatably supporting said second portion of said support member.

13. The device defined in claim 11 wherein said telescoping is in such relationship that a portion of the main shaft extends around and telescopes over the telescoped portion of said supporting member.

14. The device defined in claim 11 wherein the telescoped portion of the supporting member is radially inside of the telescoped portion of the main shaft.

15. In a change gear transmission having a floating main shaft, a plurality of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:
   means supporting one end of said main shaft for rotation and radial movement;
   rotatably mounted means mounted for rotation about a fixed axis;
   an elongated support member having one end thereof received in and coaxial with the other end of said main shaft and having the other end thereof received in, coaxial with, and rotatably supported by said rotatably mounted means;
   whereby said main shaft is supported for rotation and for angular movement at least about said other end thereof and whereby the means so mounting said main shaft require no more axial span on the external surface thereof than would be required for mounting said main shaft for rotation only.

16. In a change gear system having a floating main shaft, at least two countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:
   first means located adjacent, partially beyond and partially telescoping, one end of said main shaft for rotatively supporting same and second means for rotatively supporting the other end of said main shaft, at least one of said means also permitting radial movement of said main shaft in at least a direction transverse of a plane through the axes of said two countershafts.

17. In a change gear transmission having a floating main shaft, a pair of countershafts arranged on fixed axes parallel with and substantially symmetrically about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:
   means supporting one end of said main shaft for rotation;
   rotatably mounted means mounted for rotation about a fixed axis;
   an elongated support member having one end thereof received in and coaxial with the other end of said main shaft and having the other end thereof received in, coaxial with, and rotatably supported by said rotatably mounted means;
   whereby said main shaft is supported for rotation and for angular movement at least about said other end thereof and whereby the means so mounting said main shaft require no more axial span on the external surface thereof than would be required for mounting said main shaft for rotation only.

18. In a change gear system the combination comprising:
   a housing:
   at least two spaced countershafts having parallel axes mounted for rotation within said housing, said countershafts being held against movement other than rotative with respect to said housing;
   a plurality of groups of gears on said countershafts, each group being comprised of substantially identical countershaft gears on each of said respective countershafts;
   a ratio gear meshed with and supported by each group of said countershaft gears;
   first rotatable means rotatable around an axis which axis is arranged substantially parallel with said countershafts and located between a pair of said countershafts;
   second rotatable means rotatable on a fixed axis and arranged in nonrotatable relationship with said first rotatable means, said first and second rotatable means being further cooperatively arranged for supporting said first rotatable means in a manner to permit movement of at least a portion of said first rotatable means transversely with respect to a plane through the axes of said countershafts;
   means for selectively clutching said portion to one of said ratio gears for establishing a driving relationship from said countershafts through said one group of countershaft gears, thence to and through said one of said ratio gears for effecting driving of said second rotatable means.

19. In a change gear system, the combination comprising:
   a pair of spaced countershafts having parallel axes and means supporting said countershafts for rotation;
   countershaft gears concentrically supported in opposed pairs upon said countershafts;
   a connecting means arranged substantially parallel with said countershafts and located on an axis lying between a pair of said countershafts;
   support means rotatable on an axis fixed with respect to the axes of said countershafts and telescoped with said connecting means, rotatable therewith and supporting same to permit movement of at least a portion of said connecting means with respect to said countershafts in a direction transversely of a plane through the axes of said pair of countershafts;
   a rotatable gear substantially coaxial with said connecting means, said rotatable gear being simultaneously meshed with countershaft gears on each of said countershafts and being supported thereby for rotational movement with respect to the rotational axis of said connecting means; and
   clutching means for effecting driving connections between said countershafts and said support means through said countershaft gears, said rotatable gear and said portion of said connecting means.

20. The device defined in claim 19 wherein said connecting means is a shaft which is nonrotatably engaged with said support means at a first portion thereof and is nonrotatably connected to said rotatable gear from a second portion thereof, said second portion being axially spaced from said first portion, whereby the axis of said connecting means can move angularly with respect to the axis of said support means to permit radial movement of said second portion thereof with said rotatable gear while permitting the first portion thereof to remain rotatable about the fixed axis of said support means.

21. In a change gear system, the combination comprising:
   a pair of spaced countershafts having parallel axes and means supporting said countershafts for rotation;
   countershaft gears concentrically supported upon said countershafts;
   a ratio gear meshed with and supported by an opposed pair of countershaft gears;
   rotatable support means rotatable on an axis fixed with respect to said countershaft axes and substantially coaxial with respect to said ratio gear;
   connecting means positioned substantially coaxial with said support means;
   means connecting one end of said connecting means for rotation with said support means while permitting angular movement of the axis of said connecting means, and means connecting the other end of said connecting means for rotation with said ratio gear while permitting angular movement between the axis of said connecting means and said ratio gear;
   whereby a driving relationship is provided between said countershafts and said support means.

22. In a change gear system, the combination comprising:
   a plurality of spaced countershafts having parallel axes and means supporting said countershafts for rotation;
   countershaft gears concentrically supported in opposed pairs upon and for rotation with said countershafts;
   a rotatable shaft arranged substantially parallel with said countershafts, rotatably mounted and located between a pair of said countershafts;
   annular power transmitting means rotatable on an axis fixed with respect to the axes of said countershafts and substantially coaxial with said rotatable shaft;
   sleeve means telescoped with said power transmitting means, one end of said sleeve means being splined to said power transmitting means, said splined connection being such as to permit rocking of the axis of said sleeve means with respect to the axis of said power transmitting means, and the other end of said sleeve means being related for rotation with said rotatable shaft through second splined means permitting angular movement of the axis of said rotatable shaft with respect to the axis of said sleeve means;
   means supporting said rotatable shaft for rotation and simultaneous movement of at least one end thereof in a direction transversely of a plane through the axes of said pair of countershafts;
   a ratio gear meshed with and supported by an opposed pair of countershaft gears, encircling said rotatable shaft and movable radially with respect thereto;
   means clutching said ratio gear to said rotatable shaft.

23. In a change gear system, the combination comprising:
   a plurality of spaced countershafts having parallel axes and means supporting said countershafts for rotation;
   countershaft gears concentrically supported in opposed pairs upon and for rotation with said countershafts;
   a rotatable shaft arranged substantially parallel with said countershafts, rotatably mounted and located between a pair of said countershafts;
   sleeve-like power transmitting means rotatable on an axis fixed with respect to the axes of said countershafts and substantially coaxial with said rotatable shaft;
   sleeve means telescoped within said power transmitting means, one end of said sleeve means being splined to said power transmitting means, said splined connection being such as to permit rocking of the axis of said sleeve means with respect to the axis of said power transmitting means, and the other end of said sleeve means being related for rotation with said rotatable shaft through second splined means permitting angular movement of the axis of said rotatable shaft with respect to the axis of said sleeve means;
   means supporting one end of said rotatable shaft for rotation and the other end of said shaft for rotation and simultaneous movement in a direction transversely of a plane through the axes of said pair of countershafts;
   rotatable gears encircling said rotatable shaft and being free to float radially with respect to said rotatable shaft, said rotatable gears being simultaneously meshed with said countershaft gears on each of said countershafts and being supported thereby for rotational movement with respect to the rotational axis of said rotatable shaft; and
   clutching means for effecting driving connections between said countershafts and said power transmitting means through a selected set of said countershaft gears, a correspondingly selected set of said rotatable gears and said rotatable shaft and said sleeve.

24. In a change gear system, the combination comprising:
   a rotatively mounted shaft;
   annular power transmitting means coaxial with said rotatable shaft, said shaft and power transmitting means being mounted for relative radial movement of one with respect to the other;
   sleeve means telescoped within said annular power transmitting means, one end of said sleeve means being splined by first splined means to said power transmitting means, said splined connection being such as to permit angular movement of the axis of said sleeve means with respect to the axis of said power transmitting means, and the other end of said sleeve means being related for rotation with said rotatable shaft through second splined means and arranged to permit angular movement of the axis of said rotatable shaft with respect to the axis of said sleeve means.

25. The device defined in claim 1 wherein said plurality is two.

26. The device defined in claim 2 wherein said plurality is two.

27. The device defined in claim 3 wherein said plurality is two.

28. The device defined in claim 4 wherein said plurality is two.

29. The device defined in claim 15 wherein said plurality is two.

No references cited.

DON A. WAITE, *Primary Examiner.*